Jan. 31, 1967   J. W. WILLIAMS   3,301,349
DRIVE SPLINE LUBRICATION SYSTEM
Filed Nov. 2, 1964

INVENTOR.
JOHN W. WILLIAMS
BY
Willard S. Groen
ATTORNEY 3,301,349
DRIVE SPLINE LUBRICATION SYSTEM
John W. Williams, 3602 N. Granite Reef Road,
Scottsdale, Ariz. 85251
Filed Nov. 2, 1964, Ser. No. 408,288
2 Claims. (Cl. 184—11)

This invention pertains to improvements in lubricating systems and is particularly related to an accessory drive spline lubrication system for aircraft engines and the like.

One of the objects of this invention is to provide a spline drive connection lubricating system for greatly increasing the service life of the drive connection.

Another object is to provide an arrangement for lubricating an external spline drive connection from a lubricant filled transmission case.

Still another object is to provide a lubricating system for providing a controlled and limited supply of lubricant to an external splined drive connection from the lubricant supply in the interior of a totally enclosed transmission case.

Further features and advantages of this invention will appear from a detailed description of the drawings in which.

Figure 1:
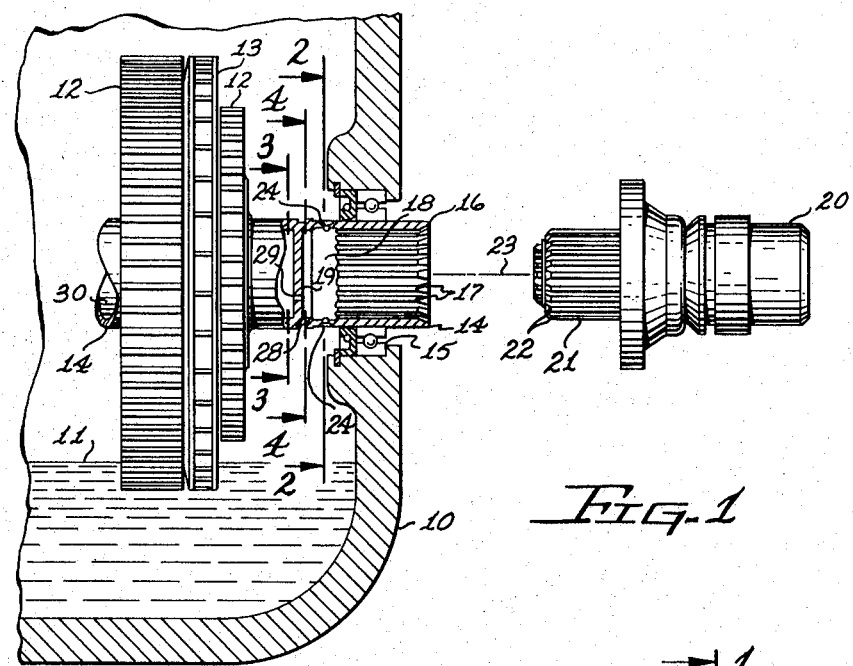
FIG. 1 is an exploded view of a splined drive connection incorporating the features of this invention partly in section on the line 1—1 of FIG. 2.

As an example of one embodiment of this invention there is shown a transmission case 10 having a supply of lubricant 11 therein which is utilized to lubricate the transmission gears 12 and other mechanism 13 contained within the transmission case mounted on a shaft 14 suitably journaled on a sealed bearing 15 carried in the transmission case 10.

Formed in the outer end 16 of the shaft 14 projecting from the transmission case 10 is an internal driving spline 17 terminating at its inner end in an annular recess 18 adjacent radially of the disposed baffle 19 of the shaft 14. A driven shaft 20 has formed on its end 21 an external mating spline 22 which fits in the spline 17 so that the shaft 14 may positively drive the shaft 20. In so doing side pressure is applied between the teeth of the splines 17–22 so that slight eccentricities between the axes 23 of rotation of the shafts 14 and 20 and pulsations from the gear drive 12 to the shaft 14 cause wear and abrasion between the splines 17 and 22 resulting in loss and damage to the shafts 14 and 20 and consequent frequent replacement of these parts.

Figure 2:
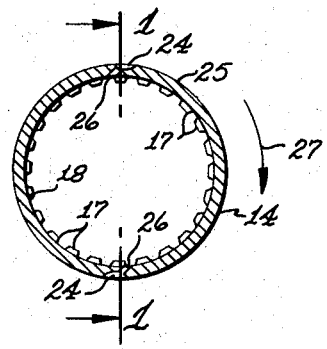
FIG. 2 is an enlarged section on the line 2—2 of FIG. 1.

Heretofore, it has been thought necessary to interengage the splines 17 and 22 and run them dry as it was thought no significant wear would result. However, extensive use in aircraft engines has proved otherwise. In order to overcome the above difficulties there has been provided one or more circumferentially spaced cavities 24, FIG. 2, in the periphery 25 of the shaft 14 with the interior of the transmission case 10 communicating through passageways 26 with the annular recess 18 adjacent the baffle 19 of shaft 14. Preferably the outer ends of the passageways 26 face in the direction of rotation of the shaft 14 as indicated by the arrow 27 so that a limited supply of lubricant 11 is transmitted through the passageways 26 to annular recess 18 and then to the surfaces of the splines 17–22.

Figure 4:
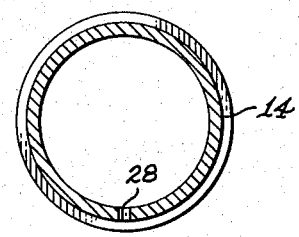
FIG. 4 is an enlarged section on the line 4—4 of FIG. 1.

If desired, a straight radially disposed passageway 28, FIG. 4, may be utilized to allow a limited supply of lubricant to be delivered from the transmission case to the splines 17 and 22.

Figure 3:
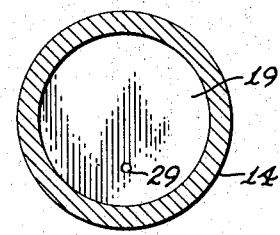
FIG. 3 is an enlarged section on the line 3—3 of FIG. 1.

In FIG. 3 is shown still another method of applying lubricant 11 from the transmission casing 10 to the splines 17 and 22 comprising a restricted passageway 29 through the baffle 19 so as to interconnect the inner hollow portion 30, which is in communication with the lubricant 11 in the transmission case, with the splines 17 and 22.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A drive spline lubrication system comprising in combination:
   (a) a transmission case having a lubricant supply therein,
   (b) a drive shaft journaled in said transmission case having a hollow bore formed axially in the outer end projecting outwardly from said transmission case,
   (c) an internal driving spline formed in said bore of the projecting outer end of said drive shaft,
   (d) a driven shaft having a mating external spline fitting within said internal driving spline,
   (e) and a radially extending restricted passageway formed in said drive shaft and extending between the periphery of said drive shaft and said bore for supplying said lubricant received from the transmission case to said splines in said drive shaft.

2. A drive spline lubrication system comprising in combination:
   (a) a transmission case having a lubricant supply therein,
   (b) a hollow drive shaft journaled in said transmission case having a hollow bore with a bottom formed axially in the outer end projecting outwardly from said transmission case,
   (c) an internal driving spline formed in said bore of the projecting outer end of said drive shaft,
   (d) a driven shaft having a mating external spline fitting within said internal driving spline,
   (e) an axially disposed restricted passageway formed in said bottom of said bore in said drive shaft connecting between the hollow interior portion of said drive shaft lying in said transmission case and said bore containing said splines in said drive shaft,
   (f) further radially extending restricted passageways in said drive shaft including cavities formed in the periphery of said drive shaft exposed to said lubricant supply in said transmission case and opening into said bore containing said drive shaft splines,
   (g) said cavities in said drive shaft including outer openings facing in the direction of rotation of said drive shaft.

References Cited by the Examiner

UNITED STATES PATENTS

| | | | |
|---|---|---|---|
| 1,720,988 | 7/1929 | Ahlm | 184—13 |
| 1,847,006 | 2/1932 | Kalisher | 184—13 X |
| 2,980,209 | 4/1961 | Rabson | 184—11 |

LAVERNE D. GEIGER, Primary Examiner.

H. BELL, Assistant Examiner.